United States Patent
Matsuda et al.

(10) Patent No.: US 9,691,020 B2
(45) Date of Patent: Jun. 27, 2017

(54) DEEP NEURAL NETWORK LEARNING METHOD AND APPARATUS, AND CATEGORY-INDEPENDENT SUB-NETWORK LEARNING APPARATUS

(71) Applicant: National Institute of Information and Communications Technology, Tokyo (JP)

(72) Inventors: Shigeki Matsuda, Tokyo (JP); Xugang Lu, Tokyo (JP); Chiori Hori, Tokyo (JP); Hideki Kashioka, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 14/787,903

(22) PCT Filed: May 15, 2014

(86) PCT No.: PCT/JP2014/062911
§ 371 (c)(1),
(2) Date: Oct. 29, 2015

(87) PCT Pub. No.: WO2014/188940
PCT Pub. Date: Nov. 27, 2014

(65) Prior Publication Data
US 2016/0110642 A1   Apr. 21, 2016

(30) Foreign Application Priority Data
May 23, 2013   (JP) ................. 2013-109061

(51) Int. Cl.
*G06N 3/04* (2006.01)
*G06N 3/08* (2006.01)
*G10L 15/16* (2006.01)

(52) U.S. Cl.
CPC ............... *G06N 3/08* (2013.01); *G06N 3/04* (2013.01); *G10L 15/16* (2013.01)

(58) Field of Classification Search
CPC ................................... G06N 3/04; G06N 3/08
See application file for complete search history.

(56) References Cited

U.S. PATENT DOCUMENTS 6,421,654 B1   7/2002   Gordon
2013/0138436 A1   5/2013   Yu et al.

FOREIGN PATENT DOCUMENTS

CN   103049792 A   4/2013
CN   103117060 A   5/2013
(Continued)

OTHER PUBLICATIONS

T. Caelli et al., "Modularity in Neural Computing", Proc. IEEE, vol. 87, No. 9, Sep. 1999, pp. 1497-1518.*
(Continued)

*Primary Examiner* — Vincent Gonzales
(74) *Attorney, Agent, or Firm* — Renner, Otto, Boisselle & Sklar, LLP (57) ABSTRACT

Provided is a DNN learning method that can reduce DNN learning time using data belonging to a plurality of categories. The method includes the steps of training a language-independent sub-network 120 and language-dependent sub-networks 122 and 124 with training data of Japanese and English. This step includes: a first step of training a DNN obtained by connecting neurons in an output layer of the sub-network 120 with neurons in an input layer of sub-network 122 with Japanese training data; a step of forming a DNN by connecting the sub-network 124 in place of the sub-network 122 to the sub-network 120 and training it with English data; repeating these steps alternately until all training data ends; and after completion, separating the first
(Continued)

sub-network 120 from other sub-networks and storing it as a category-independent sub-network in a storage medium.

8 Claims, 10 Drawing Sheets

(56) References Cited

FOREIGN PATENT DOCUMENTS

| EP | 2 221 805 A1 | 8/2010 |
|----|--------------|--------|
| JP | H10-063632 A | 3/1998 |
| WO | WO 00/03355 A2 | 1/2000 |

OTHER PUBLICATIONS

International Search report for corresponding International Application No. PCT/JP2014/062911 mailed Jul. 1, 2014.
Y. Bengio, "Learning Deep Architectures for AI", Foundations and Trends in Machine Learning, vol. 2, No. 1, pp. 1-127, 2009 (cited in the specification).
Hinton et al., "Deep Neural Networks for Acoustic Modeling in Speech Recognition: The Shared Views of Four Research Groups", IEEE Signal Processing Magazine, vol. 29, No. 6, pp. 82-97, 2012 (cited in the specification).
Mohamed et al., "Acoustic Modeling using Deep Belief Networks", IEEE Transactions on Audio, Speech, and Language Processing, vol. 20, No. 1, pp. 14-22, 2012 (cited in the specification).
Le et al., "Building High-level Features Using Large Scale Unsupervised Learning", Proc. ICML, 2012 (cited in the specification).

\* cited by examiner

DEEP NEURAL NETWORK LEARNING METHOD AND APPARATUS, AND CATEGORY-INDEPENDENT SUB-NETWORK LEARNING APPARATUS

TECHNICAL FIELD

The present invention relates to a deep neural network (hereinafter simply denoted as "DNN") used for a recognition technique such as speech recognition and image recognition. More specifically, it relates to a technique enabling acceleration of DNN learning for a specific application.

BACKGROUND ART

DNNs have attracted attention as a method of machine learning. DNNs have been applied to many applications such as image recognition and speech recognition, and their superior performances over conventional approaches have been reported in References below, where an error rate, for example, is improved by about 20 to 30%.

Y. Bengio, "Learning deep architectures for AI," Foundations and Trends in Machine Learning, Vol. 2, No. 1, pp. 1-127, 2009.

G. Hinton, L. Deng, D. Yu, G. Dahl, A. Mohamed, N. Jaitly, A. Senior, V. Vanhoucke, P. Nguyen, T. Sainath, and B. Kingsbury, "Deep Neural Networks for Acoustic Modeling in Speech Recognition: The Shared Views of Four Research Groups," IEEE Signal Processing Magazine, Vol. 29, No. 6, pp. 82-97, 2012.

A. Mohamed, G. Dahl, and G. Hinton, "Acoustic Modeling using Deep Belief Networks," IEEE Transactions on Audio, Speech, and Language Processing, Vol. 20, No. 1, pp. 14-22, 2012.

We can consider a DNN to be a neural network having layers larger in number than before. Specifically, referring to FIG. 1, a DNN 30 includes an input layer 40, an output layer 44, and a plurality of hidden layers 42 provided between input layer 40 and output layer 44. Input layer 40 has a plurality of input nodes (neurons). Output layer 44 has neurons the number of which corresponds to the number of objects to be identified. Hidden layers 42 include a plurality of hidden layers 42 (7 layers, 9 layers, 11 layers, etc.). Each hidden layer has a plurality of neurons.

Figure 1:
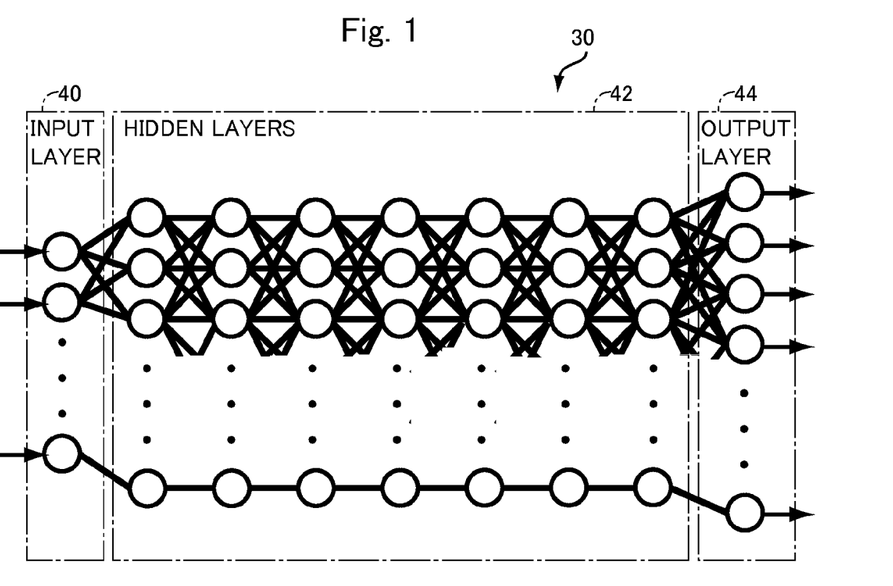
FIG. 1 schematically shows a DNN configuration.

In DNN 30, the number of layers is large and the number of neurons in each layer is also large. Therefore, the amount of computation for learning could be enormous. Previously, such computation has been almost impossible. Nowadays, computers have higher computing capabilities, and distributed/parallel processing techniques and computational theory are so developed as to allow DNN learning. When a huge amount of data is to be used for training, however, it still takes a long time for learning. By way of example, an experimental DNN learning using 10 million images of 200×200 pixels as training data took three days by 1,000 machines of 16 cores. (Quoc V. Le, Marc'Aurelio Ranzato, Rajat Monga, Matthieu Devin, Kai Chen, Greg S. Corrado, Jeff Dean Andrew Y. Ng, "Building High-level Features Using Large Scale Unsupervised Learning," Proc. ICML, 2012.)

SUMMARY OF INVENTION

Technical Problem

Figure 2:
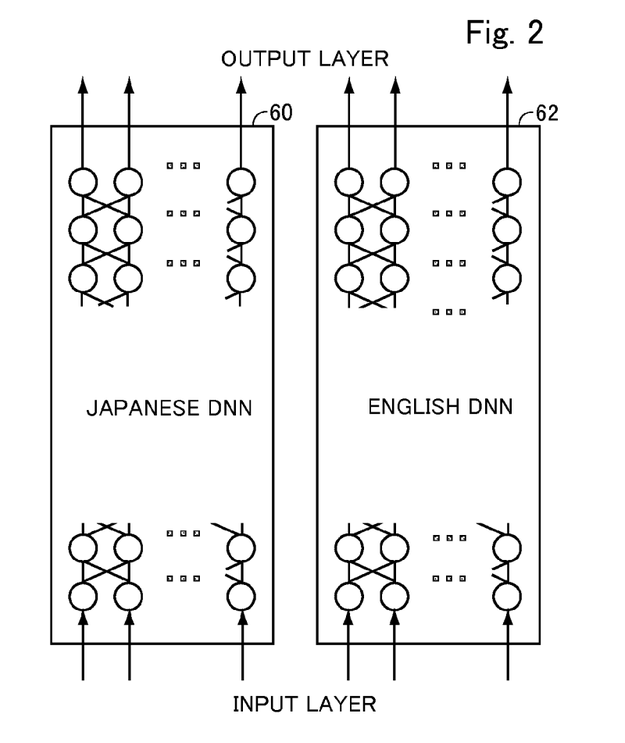
FIG. 2 illustrates an example of separate DNN learning for Japanese and English.

Assume that a DNN is applied to speech recognition, for example. Different languages have different phonetic sets and, therefore, for each object language, an individual DNN must be prepared and learning must be done separately. Referring to FIG. 2, for speech recognition of Japanese and English using DNNs, a DNN 60 for Japanese and a DNN 62 for English are prepared individually, and trained respectively using separate training data. In other words, learning of two DNNs is necessary. When speech recognition of a new language becomes necessary, a new DNN is prepared and learning is done anew. Specifically, when DNNs are to be trained for N languages in all, it takes a time approximately 7 times longer than when one DNN is trained. Such a long time required for DNN learning leads to undesirably immense amount of time for system development.

Such a problem arises not only in DNN learning for language-by-language speech recognition. By way of example, such a problem also arises when DNNs for image recognition are prepared category by category.

Therefore, an object of the present invention is to provide a method and an apparatus of DNN learning that can shorten the time necessary for DNN learning using training data of which objects belong to certain categories, as well as to provide an apparatus for recognizing an object using such a DNN.

Solution to Problem

According to a first aspect, the present invention provides, in a DNN identifying objects classified to a plurality of categories, a DNN learning method of learning, using a computer, a category-independent sub-network used commonly for the plurality of categories. The method includes a step where the computer stores first, second and third sub-networks in a storage medium; and a sub-network training step where the computer trains the first, second and third sub-networks with training data belonging to first and second categories among the plurality of categories. The sub-network training step includes: a DNN training step of the computer training a first DNN formed by connecting the second sub-network to an output side of the first sub-network with training data belonging to the first category, and training a second DNN formed by connecting the third sub-network to an output side of the first sub-network with training data belonging to the second category, and thereby realizing learning of the first and second DNNs; and a storing step of the computer separating, after completion of the DNN training step, the first sub-network from other sub-networks and storing it as the category-independent sub-network in a storage medium.

Preferably, each of the first, second and third sub-networks includes an input layer and an output layer. The DNN training step includes: an initialization step of the computer initializing the first, second and third sub-networks; a first training step of the computer connecting neurons of the output layer of the first sub-network and neurons of the input layer of the second sub-network to form a first DNN, and training the first DNN with training data belonging to the first category; a second training step of the computer connecting neurons of the output layer of the first sub-network and neurons of the input layer of the third sub-network to form a second DNN, and training the second DNN with training data belonging to the second category; and an execution step of the computer executing the first and second training steps alternately until an end condition is satisfied.

More preferably, the learning method further includes, after completion of the sub-network training step, the step of the computer separating the second sub-network from other sub-networks and storing it as a category-dependent sub-network used for an object of the first category in a storage medium.

According to a second aspect, the present invention provides, in a DNN identifying objects classified to a plurality of categories, a DNN learning method of learning, using a computer, a category-dependent sub-network used for a specific category. The method includes the steps of: the computer storing a category-independent sub-network used commonly for the plurality of categories; the computer storing the sub-network used for a specific category; the computer initializing the sub-network used for a specific category; the computer connecting neurons of an output layer of the category-independent sub-network and neurons of an input layer of the sub-network used for a specific category and thereby forming a DNN; and the computer training the sub-network used for a specific category using training data belonging to the specific category while fixing parameters of the category-independent sub-network.

According to a third aspect, the present invention provides a storage medium storing DNN sub-network parameters learned through any of the methods described above.

According to a fourth aspect, the present invention provides a computer program causing a computer to execute a method of DNN learning. This learning method is, in a DNN identifying objects classified to a plurality of categories, to train a category-independent sub-network used commonly for the plurality of categories. The method includes a storing step of the computer storing first, second and third sub-networks in a storage medium, and a sub-network training step of the computer training the first, second and third sub-networks with training data belonging to the first and second of the plurality of categories.

The sub-network learning step includes: a DNN training step of the computer training a first DNN formed by connecting a second sub-network to an output stage of the first sub-network with training data belonging to the first category, and training a second DNN formed by connecting a third sub-network to an output stage of the first sub-network with training data belonging to the second category, and thereby realizing learning of the first and second DNNs; and after completion of the DNN training step, the computer of separating the first sub-network from other sub-networks and storing it as a category-independent sub-network in a storage medium.

According to another aspect, the present invention provides, in a deep neural network identifying objects classified to a plurality of categories, a category-independent sub-network learning apparatus for realizing learning of a category-independent sub-network used commonly for the plurality of categories. The apparatus includes: a storage device for storing first, second and third sub-networks; and a sub-network training device for training the first, second and third sub-networks with training data belonging to first and second categories among the plurality of categories. The sub-network training apparatus includes: a deep neural network training device, training a first deep neural network formed by connecting the second sub-network to an output side of the first sub-network with training data belonging to the first category, and training a second deep neural network formed by connecting the third sub-network to an output side of the first sub-network with training data belonging to the second category, and thereby realizing training of the first and second deep neural networks; and a sub-network separating device separating, after completion of training by the deep neural network training device, the first sub-network from other sub-networks and storing it as the category-independent sub-network in a storage medium.

In accordance with a further aspect of the present invention, in a deep neural network identifying objects classified to a plurality of categories, a deep neural network learning apparatus realizes learning of a category-dependent sub-network used for a specific category. The apparatus includes: a storage device for storing a category-independent sub-network used commonly for the plurality of categories and the sub-network used for a specific category; an initializing device for initializing the sub-network used for a specific category; a deep neural network forming device connecting neurons of an output layer of the category-independent sub-network and neurons of an input layer of the sub-network used for a specific category and thereby forming a deep neural network; and a training device training the sub-network used for a specific category using training data belonging to the specific category while fixing parameters of the category-independent sub-network.

DESCRIPTION OF EMBODIMENTS

In the following description and in the drawings, the same components are denoted by the same reference characters. Therefore, detailed description thereof will not be repeated. Though the embodiments below mainly relate to speech recognition, application of the present invention is not limited thereto. By way of example, the present invention is also applicable to image recognition.

[Basic Concept]

As described above, when DNN learning is to be done for speeches of multiple languages, it is necessary to have individual DNNs trained with respective languages separately. This is problematic as it takes a long time. To solve this problem, DNN learning of speeches of multiple languages is conducted on the following assumptions. Experiments show that these assumptions are well grounded.

Figure 3:
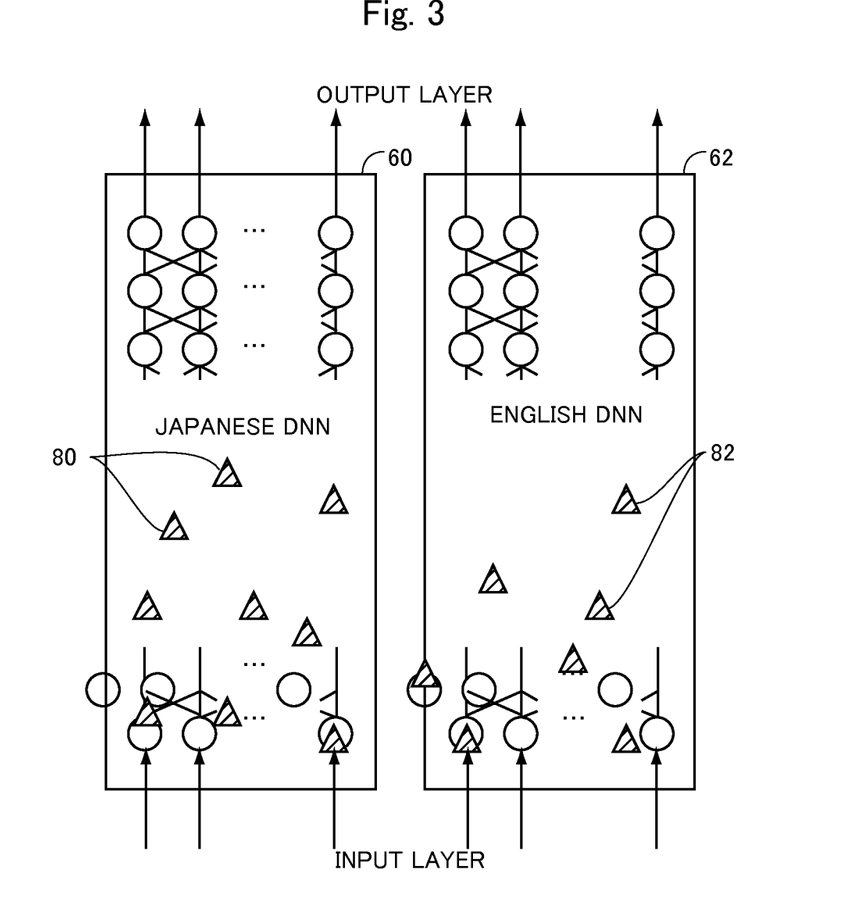
FIG. 3 is a schematic diagram showing an inner configuration of DNNs illustrating a concept of DNN learning that leads to the present invention.

(1) Even though languages are different, the object of processing is commonly a voice. Therefore, features common to multiple languages, that is, features independent of languages must be processed at the same position of the DNN. Examples of such process may include detection of phonetic attribute such as vowels, consonants, plosives and fricatives. It is assumed that such processes all take place at a layer close to an input. Specifically, as shown in FIG. 3, both in DNN 60 for Japanese and DNN 62 for English, neurons 80, 82 and the like for processing phonetic attributes such as mentioned above are positioned close to the input layer.

Figure 4:
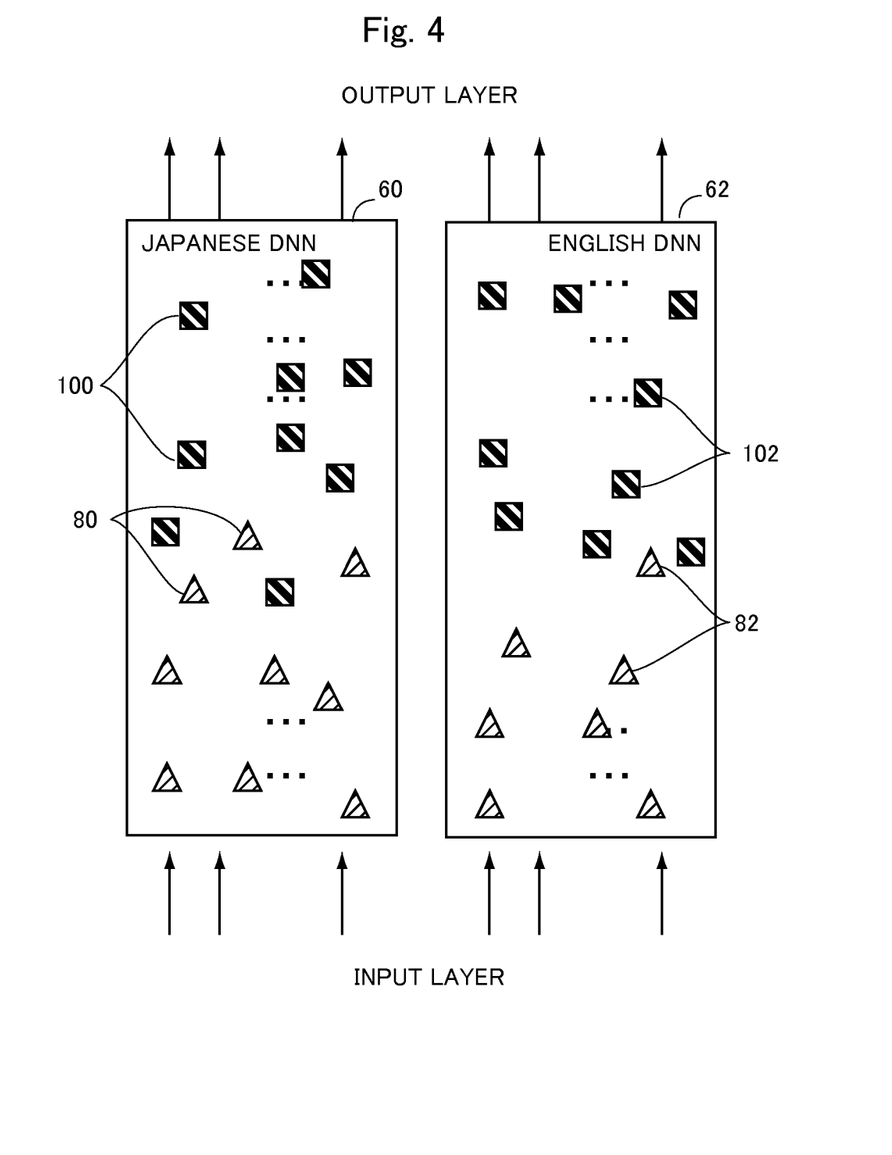
FIG. 4 is a schematic diagram showing an inner configuration of DNNs illustrating a concept of DNN learning that leads to the present invention.

(2) By contrast, referring to FIG. 4, it is assumed that a language-dependent process is done by neurons (such as neurons 100 and 102) in a layer closer to the output layer. An example of such a process is mapping from phonetic attributes to phonemes.

Figure 5:
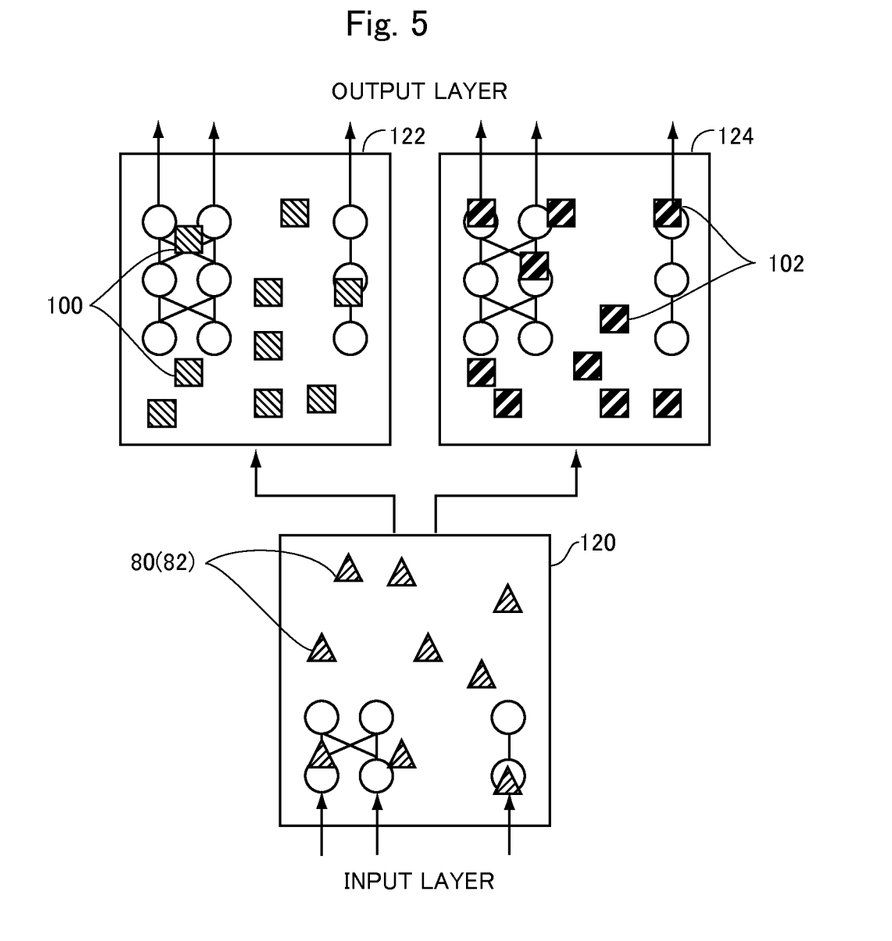
FIG. 5 is a schematic diagram showing a basic configuration of DNNs in accordance with each embodiment of the present invention.

(3) From the foregoing, it follows that, by dividing common portions (layers where neurons 80 and 82 are concentrated) of DNN 60 for Japanese and DNN 62 for English shown in FIG. 4 from subsequent layers, an independent sub-network 120, which is not dependent on any language, results as shown in FIG. 5. Remaining portions of DNN 60 for Japanese and DNN 62 for English will be dependent sub-networks depending on respective languages (for example, sub-network 122 dependent on Japanese and sub-network 124 dependent on English).

On the assumptions above, if a pre-learned independent sub-network 120 is prepared, it is possible, simply by training a dependent sub-network depending on a specific language and connecting this to independent sub-network 120, to obtain a DNN for recognizing the specific language. Compared with learning of a DNN as a whole, the number of layers of the dependent sub-network becomes smaller and, hence, the time necessary for training will be shorter.

Figure 6:
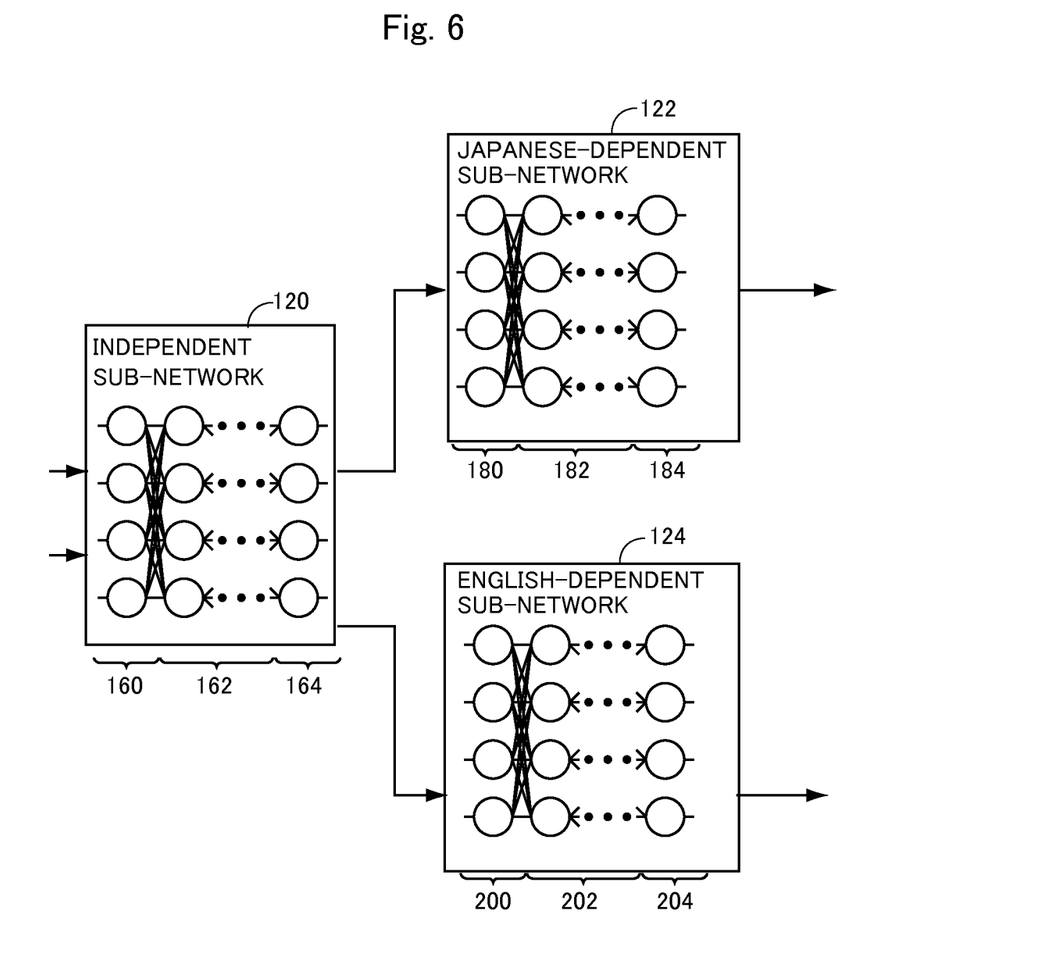
FIG. 6 is a block diagram showing a manner of connection between an independent sub-network not dependent on any language (hereinafter referred to as "independent sub-network") and language-dependent sub-networks (hereinafter referred to as "dependent sub-network"), in each of the embodiments of the present invention.

Specifically, a configuration as will be described below is possible. Referring to FIG. 6, independent sub-network 120 and dependent sub-networks 122 and 124 are prepared. Independent sub-network 120 includes an input layer 160, a hidden layer 162 and an output layer 164. Similarly, dependent sub-networks 122 and 124 also include input layers 180 and 200, hidden layers 182 and 202, and output layers 184 and 204. The number of neurons of output layer 164 of independent sub-network 120 is set to be the same as the number of neurons of input layers 180 and 200 of dependent sub-networks 122 and 124.

Figure 7:
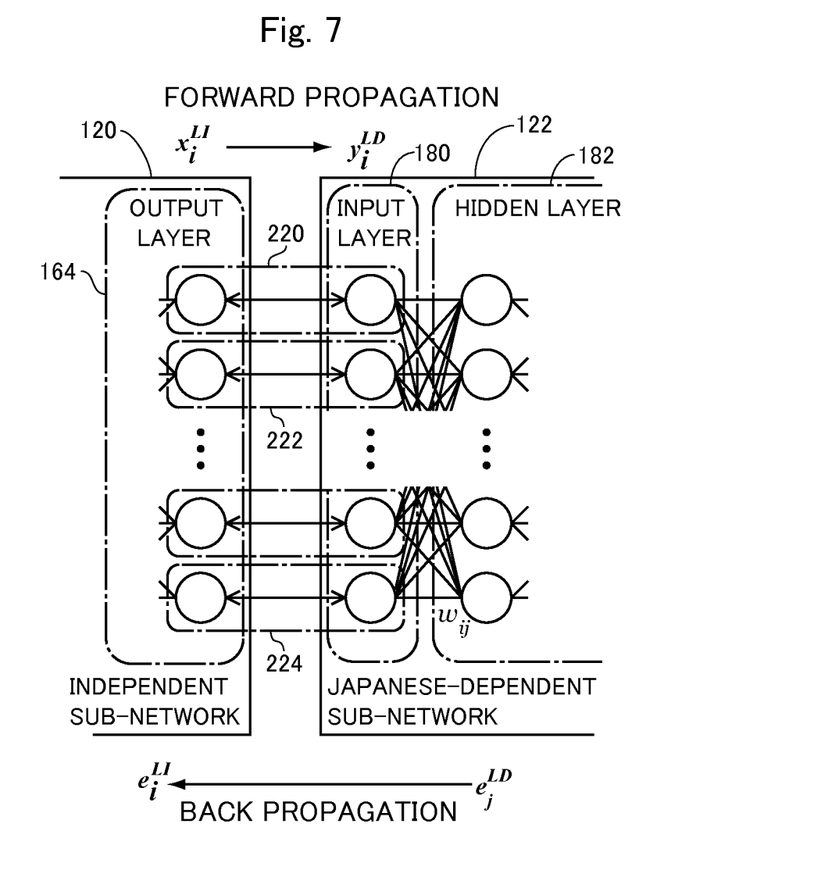
FIG. 7 is a block diagram showing a specific configuration of connection between an independent sub-network and a dependent sub-network, in each of the embodiments of the present invention.

Referring to FIG. 7, when independent sub-network 120 and dependent sub-network 122 are to be connected, each of the neurons of output layer 164 of independent sub-network 120 are connected to corresponding neurons of input layer 180 of dependent sub-network 122, to form neuron pairs 220, 222, . . . , 224. This is the reason why the number of neurons of the output layer 164 must be the same as the number of neurons of input layer 180.

In a forward propagation of training data at the time of training, an output $x_i^{LI}$ of a neuron on the side of independent sub-network 120 will be an input $y_i^{LD}$ of a neuron on the side of the input layer 180. Here, "i" is an index of the neuron, "LI" is an abbreviation of "Language Independent" indicating that it is independent of any language, and "LD" is an abbreviation of "Language Dependent" indicating that it is dependent on a language. The same applies throughout the description below.

In a back propagation, an error signal $e_i^{LI}$ of each neuron in output layer 164 of independent sub-network 120 is calculated from an error signal $e_j^{LD}$ of each neuron in the second hidden layer of dependent sub-network 122 or 124 in accordance with the following equation. Here, "j" is an index of the neuron.

$$e_i^{LI} = x_i^{LI}(1 - x_i^{LI}) \sum_j w_{ij} e_j^{LD} \qquad \text{(Equation 1)}$$

It is noted that in this equation, $w_{ij}$ represents a weight given to a connection between i-th neuron in the input layer and j-th neuron of the second layer, of dependent sub-network 122 or 124.

In the system in accordance with the present embodiment, independent sub-network 120 and dependent sub-networks 122 and 124 are simultaneously trained. As will be specifically described with reference to the flowcharts of FIGS. 9 and 10, the process of training the DNN formed by connecting independent sub-network 120 and dependent sub-network 122 using Japanese training data, and the process of training the DNN formed by connecting independent sub-network 120 and dependent sub-network 124 using English training data are repeated alternately, while switching the training data. These processes are supposed to train these sub-networks such that neurons in charge of language-independent processes common to the two languages of Japanese and English are concentrated in independent sub-network 120, neurons in charge of processes specific to Japanese are concentrated in dependent sub-network 122 and neurons in charge of processes specific to English are concentrated in dependent sub-network 124, respectively.

[Effects]

Figure 8:
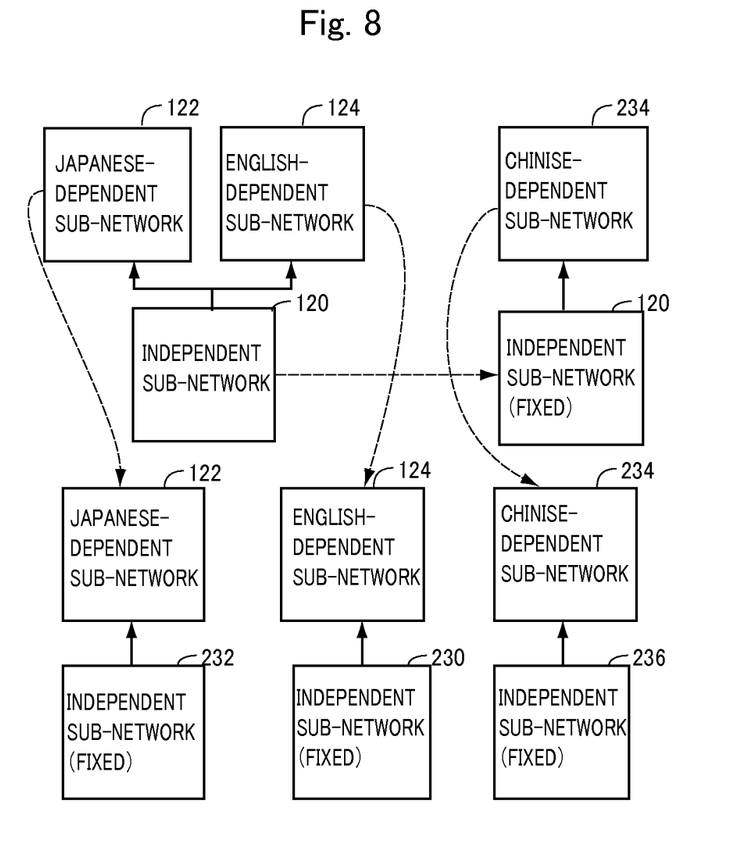
FIG. 8 is a schematic diagram showing manners of distribution and manners of connection between independent sub-networks and dependent sub-networks.

Independent sub-network 120 and dependent sub-networks 122 and 124 provided as described above attain the following effects. Referring to FIG. 8, when training of independent sub-network 120 of Japanese, dependent sub-networks 122 and 124 of English is completed as described above, dependent sub-networks 122 and 124 may be distributed combined with or separate from independent sub-network 120.

By way of example, assume that a user already has an independent sub-network 232 identical to independent sub-network 120. It is possible for the user, by obtaining dependent sub-network 122 of Japanese and connecting it to the output side of independent sub-network 232, to build a DNN for speech recognition of Japanese. If another user has an independent sub-network 230 identical to independent sub-network 120, it is possible for this user, by obtaining dependent sub-network 124 for English and connecting it to the output stage of independent sub-network 230, to build a DNN for speech recognition of English.

Further, considering from the assumption above, it follows that independent sub-network 120 could be so trained as to be usable regardless of the languages. Therefore, it becomes possible to train a DNN for a new language in a short period of time using the independent sub-network 120 in the following manner. Specifically, independent sub-network 120 is fixed (all parameters of independent sub-network 120 are made invariable), and a not-yet-learned dependent sub-network of a new language (for example, Chinese) (dependent sub-network for Chinese) 234 is connected to the output side of independent sub-network 120. Then, while fixing independent sub-network 120, the DNN consisting of independent sub-network 120 and dependent sub-network 234 is trained, using Chinese training data. Here, parameters of independent sub-network 120 are not changed and only the dependent sub-network 234 is trained. By this process, dependent sub-network 234 learns to have parameter values adapted to Chinese, and by connecting dependent sub-network 234 to the output side of independent sub-network 120, it is possible to build a DNN for Chinese speech recognition. Here again, dependent sub-network 234 may be distributed combined with or separate from independent sub-network 120. If a user already has independent sub-network 236 identical to independent sub-network 120, it is possible for the user to build a new DNN for Chinese by obtaining only the dependent sub-network 234 and combining it with independent sub-network 236.

The number of layers of dependent sub-network 234 is smaller than that of a DNN consisting of a combination of independent sub-network 120 and dependent sub-network 234. Therefore, training of dependent sub-network 234 is far less burdensome than the training of DNN as a whole. As a result, when it becomes necessary to build a DNN for a new language, the necessary DNN can be prepared in a shorter time period than conventionally required.

[Program Structure]

Figure 9:
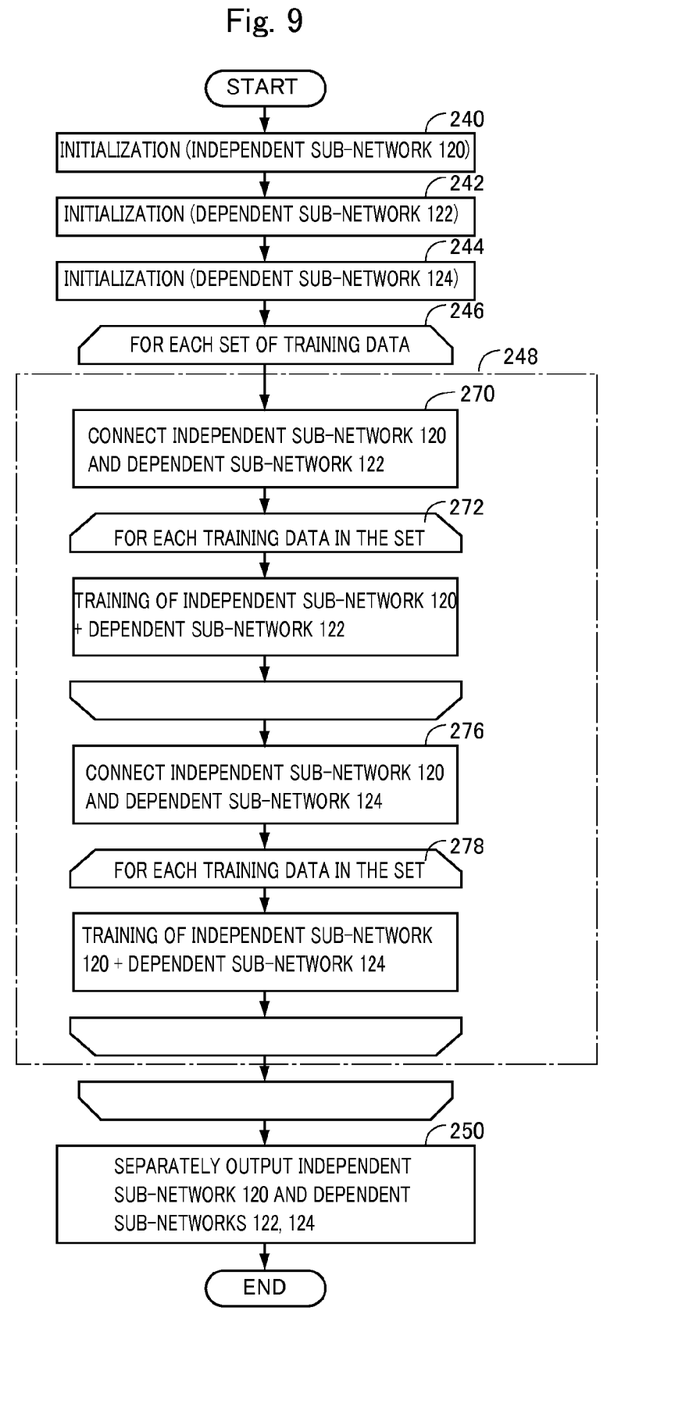
FIG. 9 is a flowchart of a program realizing simultaneous training of an independent sub-network and a dependent sub-network in a DNN in accordance with an embodiment of the present invention.
Figure 10:
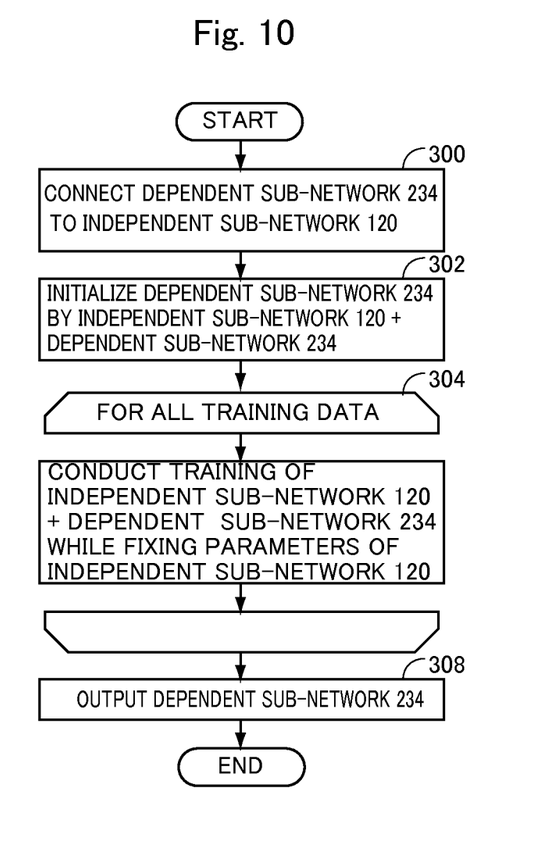
FIG. 10 is a flowchart of a program realizing a process of training a dependent sub-network while fixing an independent sub-network, in a DNN in accordance with an embodiment of the present invention.

The system described above can be implemented by computer hardware and a computer program executed on the hardware. FIG. 9 shows a flowchart of a program realizing the process of training independent sub-network 120, dependent sub-network 122 for Japanese and dependent sub-network 124 for English, and FIG. 10 shows a flowchart of a program for realizing an additional process of training dependent sub-network 234 of Chinese.

Referring to FIG. 9, the program for simultaneously training an independent sub-network and dependent sub-networks (a plurality of sub-networks, two in this example) includes: a step 240 of initializing independent sub-network 120; a step 242 of initializing dependent sub-network 122; and a step 244 of initializing dependent sub-network 124. Initialization of independent sub-network 120 is done by RBM (Restricted Boltzman Machine), in the similar manner as for a common DNN. Dependent sub-networks 122 and 124 are initialized by using RBM as in the case of independent sub-network 120, using the output of independent sub-network 120 as an input. It is also possible to initialize dependent sub-networks 122 and 124 by RBM, independent from independent sub-network 120, not using the output of independent sub-network 120.

Thereafter, using training data, independent sub-network 120 and dependent sub-networks 122 and 124 are trained simultaneously. In this example, the training data consists of both English and Japanese speech data and the results of phoneme recognition, and the English and Japanese training data are both divided to a plurality of sets.

That portion of this program which governs the training includes: a step 246 of executing the following process 248 on each set of training data; and a step 250 of separately outputting parameters of dependent sub-network 122 for Japanese and dependent sub-network 124 for English, and storing the parameters in storage media, not shown, respectively, before terminating the process.

The process 248 includes: a step 270 of connecting dependent sub-network 122 of Japanese to the output side of independent sub-network 120; a step 272 of executing learning of the DNN obtained by connecting independent sub-network 120 and dependent sub-network 122, for each of the training data for Japanese in the learning set as the object of processing; a step 276 of connecting dependent sub-network 124 for English to the output side of independent sub-network 120; and a step 278 of executing learning of the DNN obtained by connecting independent sub-network 120 and dependent sub-network 124 using each of the training data for English in the training data set as the object of learning, until the training data ends.

By executing the program shown in FIG. 9, learning of the two DNNs consisting of independent sub-network 120+dependent sub-network 122 and independent sub-network 120+dependent sub-network 124 takes place alternately, using Japanese and English data, as shown in FIG. 6. Here, independent sub-network 120 is trained using both the English and Japanese data, dependent sub-network 122 for Japanese is trained using the Japanese data, and dependent sub-network is trained using the English data. As a result, neurons related to processes unique to Japanese come to be concentrated in dependent sub-network 122 for Japanese, neurons related to processes unique to English come to be concentrated in dependent sub-network 124 for English, and neurons independent of any language come to be concentrated in independent sub-network 120, respectively.

FIG. 10 shows, in a flowchart, a control structure of a program for realizing training of a dependent sub-network for a new language (for example, Chinese) (dependent sub-network 234 shown in FIG. 8) after obtaining independent sub-network 120.

Referring to FIG. 10, the program includes: a step 300 of connecting dependent sub-network 234 to the output side of independent sub-network 120 and thereby creating a new DNN; a step 302 of initializing the DNN consisting of independent sub-network 120+dependent sub-network 234 by a known method; a step 304 of training the DNN while fixing the parameters of independent sub-network 120, using training data of Chinese; and a step 308 of outputting, after the training, dependent sub-network 234 separately from independent sub-network and storing in a storage medium, not shown.

By executing the program shown in FIG. 10, learning of the DNN obtained by connecting dependent sub-network 234 for Chinese to independent sub-network 120 can be realized. Since parameters for independent sub-network 120 are fixed, the subject of this training is only the dependent sub-network 234. In the experiment as will be described later, even when dependent sub-network 234 trained in this manner was connected to the output side of independent sub-network 120, performance comparable to the DNN trained originally for Chinese could be obtained. Details will be discussed in the Experiments section below.

[Hardware Configuration]

Figure 11:
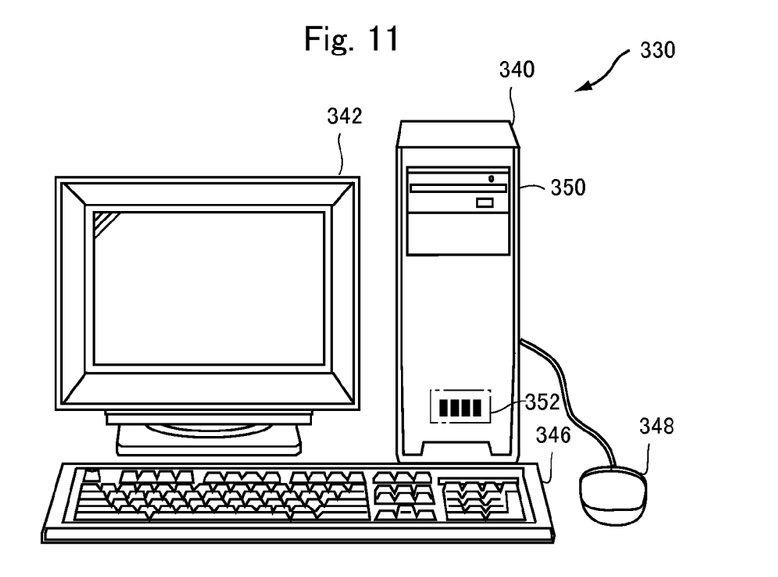
FIG. 11 shows an appearance of a computer system executing the DNN learning process in accordance with an embodiment.

The system in accordance with the above-described embodiment can be realized by computer hardware and the above-described computer program executed on the computer hardware. FIG. 11 shows an appearance of such a computer system 330, and FIG. 12 shows an internal configuration of computer system 330.

Referring to FIG. 11, computer system 330 includes a computer 340 including a memory port 352 and a DVD (Digital Versatile Disc) drive 350, a keyboard 346, a mouse 348, and a monitor 342.

Figure 12:
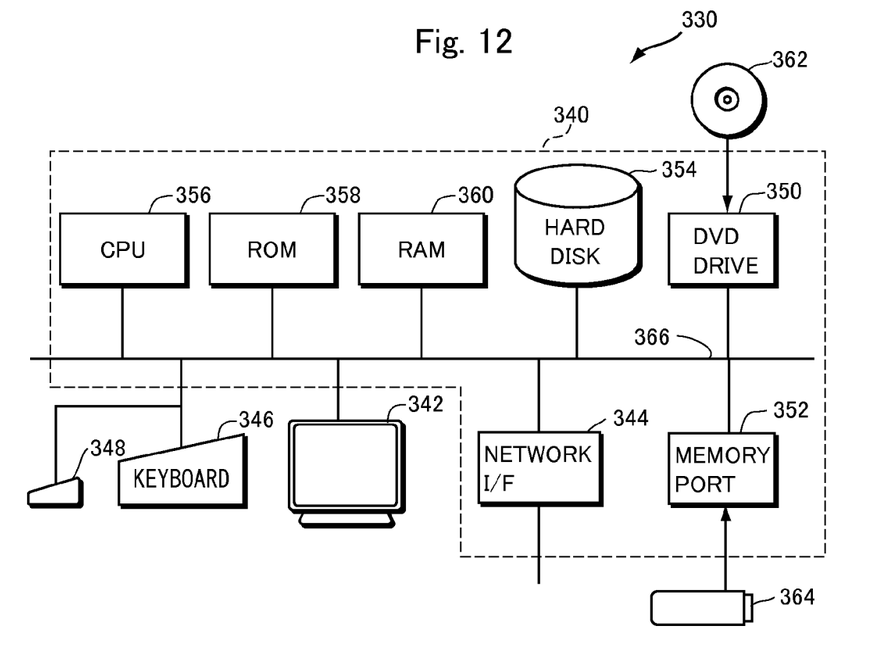
FIG. 12 is a block diagram showing an internal configuration of the computer shown in FIG. 11.

Referring to FIG. 12, in addition to memory port 352 and DVD drive 350, computer 340 includes: a CPU (Central Processing Unit) 356; a bus 366 connected to CPU 356, memory port 352 and DVD drive 350; a read only memory (ROM) 358 storing a boot-up program and the like; and a random access memory (RAM) 360, connected to bus 366, for storing program instructions, a system program, work data and the like. Computer system 330 further includes a network interface (I/F) 344 providing network connection to enable communication with other terminals.

The computer program causing computer system 330 to function as various functional units of the embodiment above is stored in a DVD 362 or a removable memory 364, which is loaded to DVD drive 350 or memory port 352, and transferred to a hard disk 354. Alternatively, the program may be transmitted to computer 340 through a network, not shown, and stored in hard disk 354. At the time of execution, the program is loaded to RAM 360. The program may be directly loaded to RAM 360 from DVD 362, from removable memory 364, or through the network.

The program includes a sequence of instructions consisting of a plurality of instructions causing computer 340 to function as various functional units of the system in accordance with the embodiment above. Some of the basic functions necessary to carry out such operations may be provided by the operating system running on computer 340, by a third-party program, or various programming tool kits or program library installed in computer 340. Therefore, the program itself may not include all functions to realize the system and method of the present embodiment. The program may include only the instructions that call appropriate functions or appropriate program tools in the programming tool kits in a controlled manner to attain a desired result and thereby to realize the functions of the system described above. Naturally the program itself may provide all necessary functions.

In the embodiment shown in FIGS. 5 to 9, the training data, the parameters of each sub-network and the like are stored in RAM 360 or hard disk 354. The parameters of sub-networks may also be stored in removable memory 364 such as a USB memory, or they may be transmitted to another computer through a communication medium such as a network.

The operation of computer system 330 executing the computer program is well known. Therefore, details thereof will not be repeated here.

[Experiments]

Effectiveness of the system based on the assumptions above was verified through experiments. The experiments were on frame-level phoneme classification performance using Japanese, English and Chinese speech data. The speech data were collected from data transmitted from speech translation application already used on smart phones and the like to a speech translation server.

Acoustic parameters consisted of up to 12th MFCC coefficients, logarithmic voice power, and deltas ($\Delta$) and delta-deltas ($\Delta\Delta$) of these between frames. Specifically, a total of 39 dimensional features were used. The frame length was 20 milliseconds and the frame shift was 10 milliseconds. In all, 429 dimensional feature vectors consisting of 11 frames including five preceding and succeeding frames per 1 frame were used as the input to the DNNs.

The numbers of Japanese, English and Chinese phonemes were 26, 39 and 30, respectively. The number of neurons in the output layers in the DNNs is the same as the number of phonemes for each language.

The training data included 40,000 utterances or about 25 hours of speech data, for each language. The number of evaluation data was 1,000. Each utterance has a terminal number, and no terminal number in the evaluation data was included in the training data.

In a pre-training stage, a fixed learning rate of 0.005 was used for estimating RBM parameters. Number of repetitions of training (epoch number) was 100. In a fine-tuning stage, the learning rate started at 0.001, and if the error in development data increased, the learning rate was halved. The number of development data was 2,000. No terminal number in the development data was included in the training data or the evaluation data. RBMs and DNNs were trained with a mini-batch size of 128.

Base Line:

The phoneme classification performances using conventional DNNs trained language by language were used as the baseline for evaluating the DNNs in accordance with the present invention. The numbers of layers in DNNs were two, four and six, excluding input layer. The number of hidden neurons was 512 in each layer. In the pre-training stage, the DNNs of respective languages were initialized separately, using Japanese, English and Chinese speech data. For each neuron, sigmoid function was used as an output function. The phoneme classification performances of DNNs are as shown in Table 1.

TABLE 1

| Number of Layers | Lanaugage | | |
|---|---|---|---|
| | Japanese | English | Chinese |
| 2 | 71.69 | 51.09 | 60.37 |
| 4 | 73.28 | 51.51 | 61.58 |
| 6 | 75.13 | 54.50 | 62.58 |

From Table 1, it is understood that the classification rate improved by increasing the number of layers, regardless of the languages.

Further, in accordance with the method of DNN learning described with reference to the embodiment above, an independent sub-network, a dependent sub-network for Japanese and a dependent sub-network for English were trained simultaneously, using Japanese and English training data. Here, these will be referred to as $LI_{Jp, En}$, $LD_{Jp}$ and $LD_{En}$, respectively. Thus, a DNN ($LI_{Jp, En} \rightarrow LD_{Jp}$) for Japanese and a DNN ($LI_{Jp, En} \rightarrow LD_{En}$) for English were obtained. Using the similar method, we obtained $LD_{Jp}$ and $LD_{Ch}$ and an independent sub-network $LI_{Jp,Ch}$ through training using Japanese and Chinese training data. In the experiment, sigmoid function was used as the output function of neurons in the hidden and output layers of the LI and neurons in the hidden layers of the LD. Softmax function was used for neurons in the output layer of the LD. The number of neurons was 512 in each hidden layer, the same as that in the baseline. The number of layers in these DNNs was six.

Table 2 shows phoneme classification performance obtained using the two DNNs ($LI_{Jp, En} \rightarrow LD_{Jp}$ and $LI_{Jp, En} \rightarrow LD_{En}$), and Table 3 shows phoneme classification performance obtained using the other DNNs ($LI_{Jp,Ch} \rightarrow LD_{Jp}$ and $LI_{Jp,Ch} \rightarrow LD_{Ch}$).

TABLE 2

| Number of Layers | | Language | |
| --- | --- | --- | --- |
| LI | LD | English | Japanese |
| 1 | 5 | 54.37 | 74.73 |
| 2 | 4 | 54.61 | 74.86 |
| 3 | 3 | 54.63 | 74.90 |
| 4 | 2 | 54.59 | 74.82 |
| 5 | 1 | 52.50 | 73.38 |

TABLE 3

| Number of Layers | | Language | |
| --- | --- | --- | --- |
| LI | LD | Chinese | Japanese |
| 1 | 5 | 62.89 | 74.60 |
| 2 | 4 | 62.93 | 74.67 |
| 3 | 3 | 63.10 | 74.85 |
| 4 | 2 | 63.08 | 74.70 |
| 5 | 1 | 62.05 | 74.08 |

It can be seen from Tables 2 and 3 that the performance when two or more layers were used for the dependent sub-network was almost the same as that of the baseline. The highest performance was attained when the same number of layers was allocated to LI and LD, while the difference is small. From the foregoing, generally, we can conclude that better performance can be attained when the DNN is divided to an independent sub-network and dependent sub-networks and a plurality of languages are learned simultaneously in accordance with the embodiment above, than when learning of individual DNNs is done from the start for each language.

Finally, to an independent sub-network, a dependent sub-network of a language not used for the training of the independent sub-network was connected and trained with the parameters of independent sub-network fixed, and the phoneme classification performance of the resulting DNN was examined. Specifically, phoneme classification performances of Chinese and English of two DNNs, that is, DNN ($LI_{Jp,En} \rightarrow LD_{Ch}$) and DNN ($LI_{Jp,Ch} \rightarrow LD_{En}$) were evaluated. Table 4 shows the results.

TABLE 4

| Number of Layers | | Language | |
| --- | --- | --- | --- |
| LI | LD | Chinese | English |
| 1 | 5 | 62.44 | 53.00 |
| 2 | 4 | 63.50 | 54.74 |
| 3 | 3 | 63.57 | 55.66 |
| 4 | 2 | 62.63 | 55.34 |
| 5 | 1 | 59.29 | 51.18 |

As can be seen from Table 4, in the afore-mentioned DNNs, substantially, only the dependent sub-network for Chinese and the dependent sub-network for English were trained. The phoneme classification performances of resulting DNNs, however, are comparable to the baseline performance, except for the LD having only one layer.

The experiments above show the strong possibility that the assumptions as the basis of the present invention are actually correct. Specifically, when an independent sub-network and dependent sub-networks of different languages are trained simultaneously using training data of a plurality of languages, neurons related to processes independent of any language come to concentrate in the independent sub-network, and neurons specifically related to speech processing of the corresponding language concentrate in the dependent sub-network of each language. Therefore, it is believed that sufficiently high classification performance will be attained when a DNN is created by connecting the independent sub-network to a dependent sub-network of a language not used for learning. In other words, once an independent sub-network is obtained, it is possible to attain the classification performance comparable to that attained by a DNN learned from the start, simply by training a dependent sub-network for a new language and connecting the resulting dependent sub-network to the output side of the independent sub-network. Since the number of layers in the dependent sub-network is smaller than the number of layers of the DNN as a whole, the time necessary for the learning can be far shorter than necessary for the learning of DNN as a whole.

The above-described embodiment and the experiments relate to phoneme classification of languages. Here, the number of neurons in the output layer of DNN is set to be the same as the number of phonemes of each language. The present invention, however, is not limited to such an embodiment. While Hidden Markov Model (HMM) is often used as an acoustic model for speech recognition, DNN may be used in place of HMM. In that case, the DNN is to estimate hidden states and, therefore, the number of neurons in the output layer of the DNN is set to be the same as the number of assumed hidden states.

<Modification>

The embodiment described above relates to speech processing. The application of the present invention, however, is not limited to speech processing. By way of example, it is similarly applicable to image recognition. For speech processing, languages are clearly distinguishable. Therefore, conventionally, DNN learning has been done language by language. Therefore, as discussed in the embodiment, when an independent sub-network is formed by extracting portions not dependent on any language, it can advantageously be used commonly for multiple languages. In this respect, for image recognition, if there is any category that can clearly distinguish objects, learning of DNNs for image recognition can efficiently be done category by category in place of the languages of the examples above, using the present invention.

For example, detection of basic features of images such as edge detection as a basis for image recognition is conducted commonly, regardless of the nature of objects. On the other hand, identification of specific objects in images is considered to be based on higher features. Therefore, it is possible to form DNNs for identifying objects in images by a sub-network independent of any category of images (independent sub-network) and sub-networks dependent on categories (dependent sub-networks) dependent on categories prepared for each category of images.

For the training, images containing objects belonging to a plurality of categories are prepared, and separate dependent sub-networks and an independent sub-network for the images are prepared. Then, the dependent sub-network for one category is connected to the independent sub-network, and the DNN is trained for images belonging to the category. After completing a prescribed amount of learning, the dependent sub-network is changed to one for a different category, and the DNN is trained using images belonging to that different category. By repeating such trainings, an independent sub-network independent of any category of images and dependent sub-networks for images of various categories can be obtained. By fixing parameters of independent sub-network, training of a sub-network for images of a category not used for learning is possible, as in the above-described embodiment. The time for learning can also be shortened.

Therefore, the present invention is effectively applicable to DNN learning for object identification in images.

Further, the present invention is applicable not only to the identification process of speeches or images. It is applicable to any data, provided that data of one same type involve a plurality of categories and the data can be classified to the categories.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention can be used generally in industries that involve classification of data to any of a plurality of categories.

REFERENCE SIGNS LIST

30 Deep Neural Network (DNN)
60 Japanese DNN
62 English DNN
80, 82, 100, 120 neuron
120, 230, 232, 236 independent network
122 dependent sub-network for Japanese
124 dependent sub-network for English
160, 180, 200 input layer
162, 182, 184 hidden layer
164, 184, 204 output layer
220, 222, 224 neuron pairs
234 dependent sub-network for Chinese

The invention claimed is:

1. A training method for speech recognition using a deep neural network configured to identify speech objects classified to a plurality of categories utilizing, for each of said plurality of categories, a category-independent sub-network, the method comprising:
storing on a non-transitory computer readable medium a first sub-network, a second sub-network, and a third sub-network; and
training with a processor said first sub-network, said second sub-network, and said third sub-network with training data belonging to a first category and a second category of the plurality of categories;
wherein training said first sub-network and said second sub-network includes:
training a first deep neural network formed by connecting said second sub-network to an output side of said first sub-network with training data belonging to said first category,
training a second deep neural network formed by connecting said third sub-network to an output side of said first sub-network with training data belonging to said second category, and
separating, after completion of training of the first deep neural network and training of the second deep neural network, said first sub-network from other sub-networks and storing in the non-transitory computer readable medium said first sub-network as said category-independent sub-network.

2. The learning method according to claim 1, wherein:
each of said first, second and third sub-networks includes an input layer and an output layer;
training of said first deep neural network and said second deep neural network includes:
initializing with the processor said first sub-networks, said second sub network, and said third sub-networks,
connecting neurons of said output layer of said first sub-network and neurons of said input layer of said second sub-network to form a first deep neural network, and training said first deep neural network with training data belonging to said first category,
connecting neurons of said output layer of said first sub-network and neurons of said input layer of said third sub-network to form a second deep neural network, and training said second deep neural network with training data belonging to said second category, and
executing with the processor said first and second training steps alternately until an end condition is satisfied.

3. The learning method according to claim 2, further comprising, after completion of training of said first sub-network, second sub-network, and a third sub-network with training data separating said second sub-network from other sub-networks and storing said second sub-network as a category-dependent sub-network used for an object of said first category.

4. The learning method according to claim 1, further comprising, after completion of training of said first sub-network, second sub-network, and third sub-network with training data, separating said second sub-network from other sub-networks and storing the second sub-network in the non-transitory computer readable medium as a category-dependent sub-network used for an object of said first category.

5. The learning method of claim 1, wherein each of the plurality of categories is a different language.

6. A training method for speech recognition using a deep neural network configured to identify speech objects classified to a plurality of categories utilizing, for a specific category, a category-dependent sub-network, the method comprising:
storing in a non-transitory computer readable medium category-independent sub-network used commonly for said plurality of categories;
storing in a non-transitory computer readable medium said sub-network used for a specific category;
initializing with a processor said sub-network used for a specific category;
forming a deep neural network, using a processor by connecting neurons of an output layer of said category-independent sub-network and neurons of an input layer of said sub-network used for a specific category; and
training with the processor said sub-network used for a specific category using training data belonging to said specific category while fixing parameters of said category-independent sub-network.

7. A category-independent sub-network learning apparatus for speech recognition using a deep neural network configured to identify speech objects classified to a plurality of categories and realize learning of a category-independent sub-network used commonly for said plurality of categories, said apparatus comprising:

a non-transitory computer readable medium for storing a first sub-network, a second sub-network, and a third sub-network; and a processor configured to train said first sub-network, said second sub-network, and said third sub-network with training data belonging to a first category and a second category among said plurality of categories;

wherein said processor is further configured to:
    train a first deep neural network formed by connecting said second sub-network to an output side of said first sub-network with training data belonging to said first category, and
    train a second deep neural network formed by connecting said third sub-network to an output side of said first sub-network with training data belonging to said second category, and separate, after completion of training of said first deep neural network and said second deep neural network, said first sub-network from other sub-networks and store as in the non-transitory computer readable medium the first sub-network as said category-independent sub-network.

8. A deep neural network learning apparatus for speech recognition using a deep neural network configured to identify speech objects classified to a plurality of categories and for realizing learning of a category-dependent sub-network used for a specific category, the apparatus comprising:

a non-transitory computer readable medium configured to store a category-independent sub-network used commonly for said plurality of categories and said sub-network used for a specific category;

a processor configured to:
    initialize said sub-network used for a specific category;
    form a deep neural network by connecting neurons of an output layer of said category-independent sub-network and neurons of an input layer of said sub-network used for a specific category; and
    a train said sub-network used for a specific category using training data belonging to said specific category while fixing parameters of said category-independent sub-network.

* * * * *